United States Patent
Arimilli et al.

(10) Patent No.: US 8,595,443 B2
(45) Date of Patent: Nov. 26, 2013

(54) VARYING A DATA PREFETCH SIZE BASED UPON DATA USAGE

(75) Inventors: Ravi K. Arimilli, Austin, TX (US); Gheorghe C. Cascaval, Carmel, NY (US); Balaram Sinharoy, Poughkeepsie, NY (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 12/024,163

(22) Filed: Feb. 1, 2008

(65) Prior Publication Data

US 2010/0293339 A1    Nov. 18, 2010

(51) Int. Cl.
*G06F 12/08* (2006.01)

(52) U.S. Cl.
USPC .................................. 711/137; 711/E12.057

(58) Field of Classification Search
USPC ........................... 711/137, E12.001, E12.057
See application file for complete search history.

(56) References Cited

U.S. PATENT DOCUMENTS

| | | | |
|---|---|---|---|
| 5,210,842 A | 5/1993 | Sood | |
| 6,058,456 A | 5/2000 | Arimilli et al. | |
| 6,360,297 B1 | 3/2002 | Arimilli et al. | |
| 6,470,427 B1 | 10/2002 | Arimilli et al. | |
| 6,499,085 B2 | 12/2002 | Bogin et al. | |
| 6,571,319 B2 | 5/2003 | Tremblay et al. | |
| 6,643,744 B1 | 11/2003 | Cheng | |
| 6,678,795 B1 * | 1/2004 | Moreno et al. | ................. 711/137 |
| 6,681,296 B2 | 1/2004 | Liao et al. | |
| 6,704,860 B1 | 3/2004 | Moore | |
| 6,823,447 B2 | 11/2004 | Hay et al. | |
| 6,957,305 B2 | 10/2005 | Ray et al. | |
| 7,177,985 B1 * | 2/2007 | Diefendorff | ................... 711/137 |
| 7,234,040 B2 | 6/2007 | Berg et al. | |
| 7,237,068 B2 | 6/2007 | Wallin et al. | |
| 2003/0208665 A1 | 11/2003 | Pier et al. | |
| 2006/0179239 A1 | 8/2006 | Fluhr et al. | |
| 2006/0212648 A1 | 9/2006 | Cox et al. | |
| 2007/0005934 A1 * | 1/2007 | Rotithor et al. | ................ 711/213 |

OTHER PUBLICATIONS

Sheu et al.; "The Selection of Optimal Cache Lines for Microprocessor Based Controllers"; Proceedings of the 23rd Annual Workshop and Symposium on Microprogramming and Micro-Architecture MICRO 23, Nov. 1990.

Milenkovic et al.; "Compiler and Runtime Hints for Memory Management"; IBM TDB n8b, pp. 76-77, Jan. 1990.

Song; "Methods of Specifying Data Pre-Fetching Without Using a Separate Instruction"; IBM TDB vol. 38, No. 6, pp. 355-356, Jun. 1995.

Hazim; "System and Method to Improve Hardware Pre-Fetching Using Translation Hints"; DOSS# AUS920040822, Oct. 2004.

Wang; "Cooperative Hardware/Software Caching for Next Generation Memory Systems"; vol. 6501B of Dissertations Abstracts International, 2004.

(Continued)

*Primary Examiner* — Kenneth Lo
(74) *Attorney, Agent, or Firm* — Yudell Isidore Ng Russell PLLC

(57) ABSTRACT

A method of data processing in a processor includes maintaining a usage history indicating demand usage of prefetched data retrieved into cache memory. An amount of data to prefetch by a data prefetch request is selected based upon the usage history. The data prefetch request is transmitted to a memory hierarchy to prefetch the selected amount of data into cache memory.

15 Claims, 5 Drawing Sheets

(56) References Cited

OTHER PUBLICATIONS

Funk et al.; "Instruction Cache Block Retro-Fitted onto Microprocessor"; IBM TDB vol. 28, No. 7, pp. 53-56, Jul. 1995.

Van Peursem; "A New Hardware Pre-Fetching Scheme Based on Dynamic Interpretation of the Instruction Stream Cache"; vol. 5509B of Dissertations Abstracts International; 1994.

Duncan et al.; "High Performance I/O Design in the Alphaserver 4100 Symmetric Mutliprocessing System"; Digital Technical Journal; vol. 8; No. 4; pp. 61-75; 1996.

Tian et al.: "A Unified Compressed Cache Hierarchy Using Simple Frequent Pattern Compression and Partial Cache Line Pre-Fetching"; Embedded Software and Systems; Third International Conference; ICESS 2007; May 2007.

\* cited by examiner

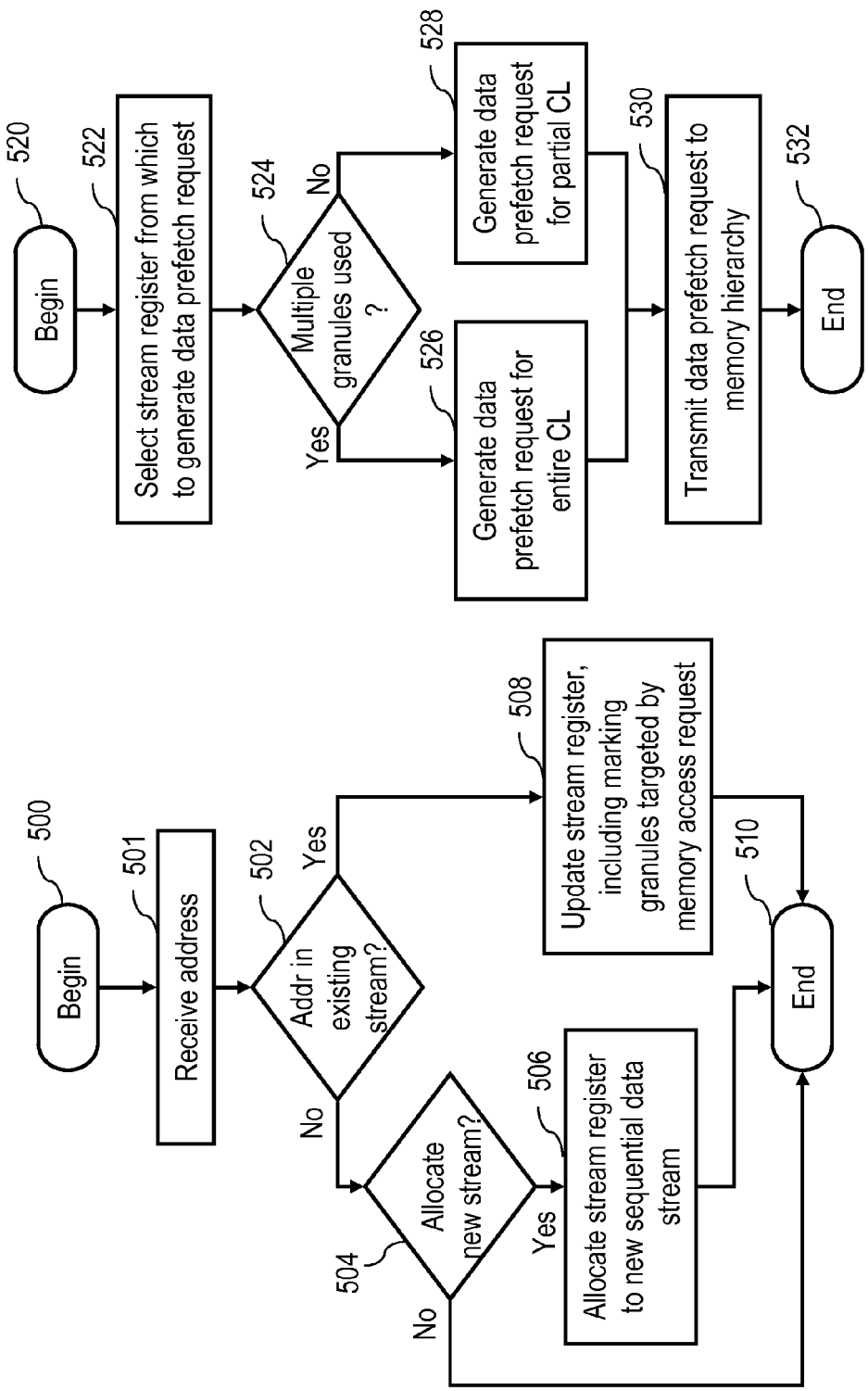

VARYING A DATA PREFETCH SIZE BASED UPON DATA USAGE

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, data prefetching.

2. Description of the Related Art

As system memory latencies have increased in terms of processor clock cycles, computer architects have applied significant design effort to improvements in data caching (for handling previously used data) and data prefetching (for retrieving data in anticipation of use). Enhancements to data caching and data prefetching tend to be complementary in that enhancements to data caching techniques tend to achieve greater latency reductions for applications having significant data reuse, while enhancements to data prefetching tend to achieve greater latency reductions for applications having less data reuse.

In operation, hardware data prefetchers generally detect patterns of memory accesses forming one or more sequential address streams. A sequential address stream is defined as any sequence of memory accesses that reference a set of cache lines with monotonically increasing or decreasing addresses. The address offset between the addresses of adjacent memory accesses in a particular sequential address stream is often referred to as the "stride". In response to a detection of a sequential address stream, the hardware data prefetcher then prefetches up to a predetermined number of cache lines into a low latency data cache in advance of a current demand memory access.

SUMMARY OF THE INVENTION

In at least some embodiments, a method of data processing in a processor includes maintaining a usage history indicating demand usage of prefetched data retrieved into cache memory. An amount of data to prefetch by a data prefetch request is selected based upon the usage history. The data prefetch request is transmitted to a memory hierarchy to prefetch the selected amount of data into cache memory.

BRIEF DESCRIPTION OF THE DRAWINGS

FIG. 5A is a high level logical flowchart of an exemplary process by which a data prefetch unit allocates entries in a prefetch request queue in accordance with the present invention; and FIG. 5B is a high level logical flowchart of an exemplary process by which a data prefetch unit generates data prefetch requests that request varying amounts of data in accordance with the present invention.

DETAILED DESCRIPTION OF ILLUSTRATIVE EMBODIMENT

Figure 1:
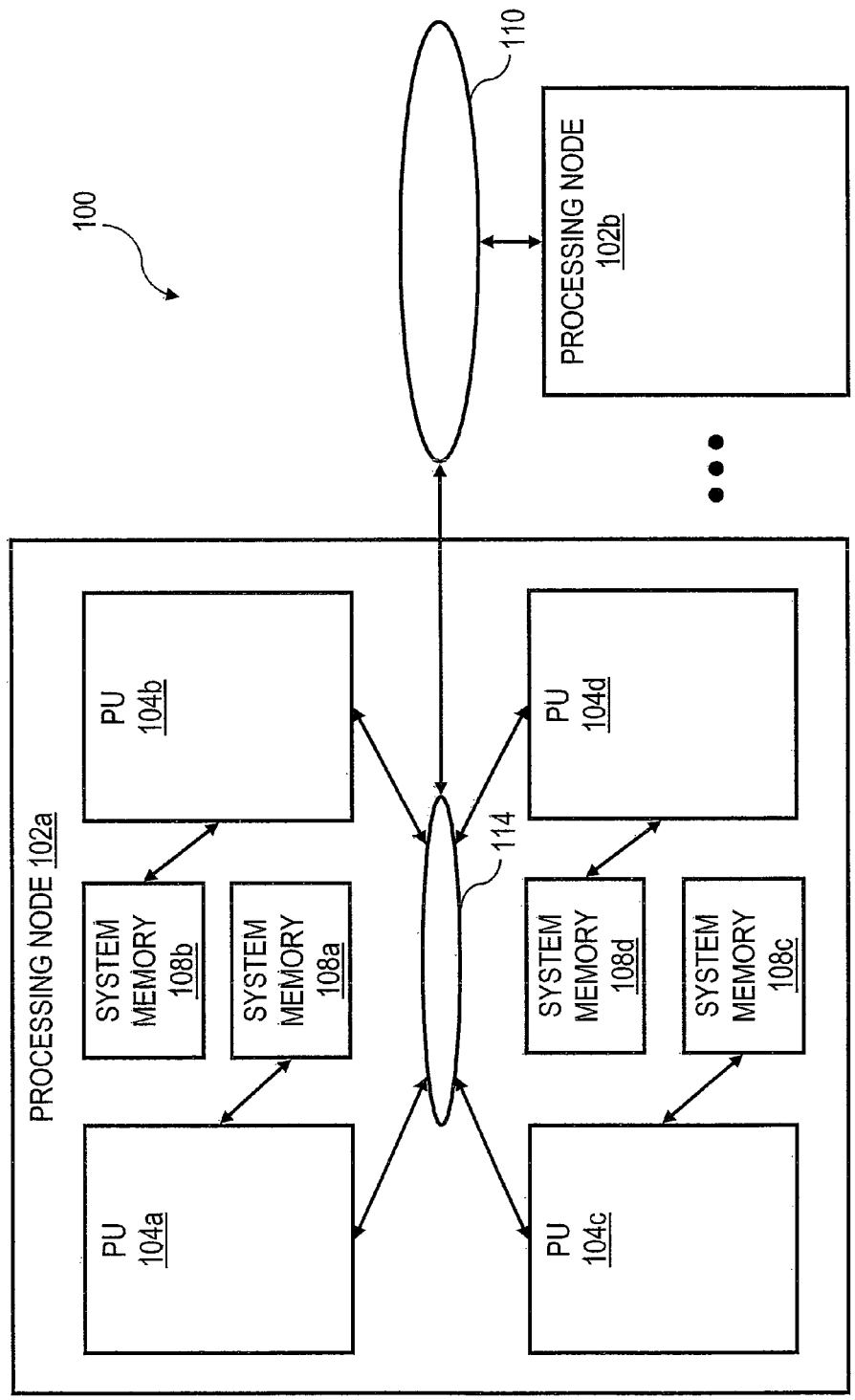
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
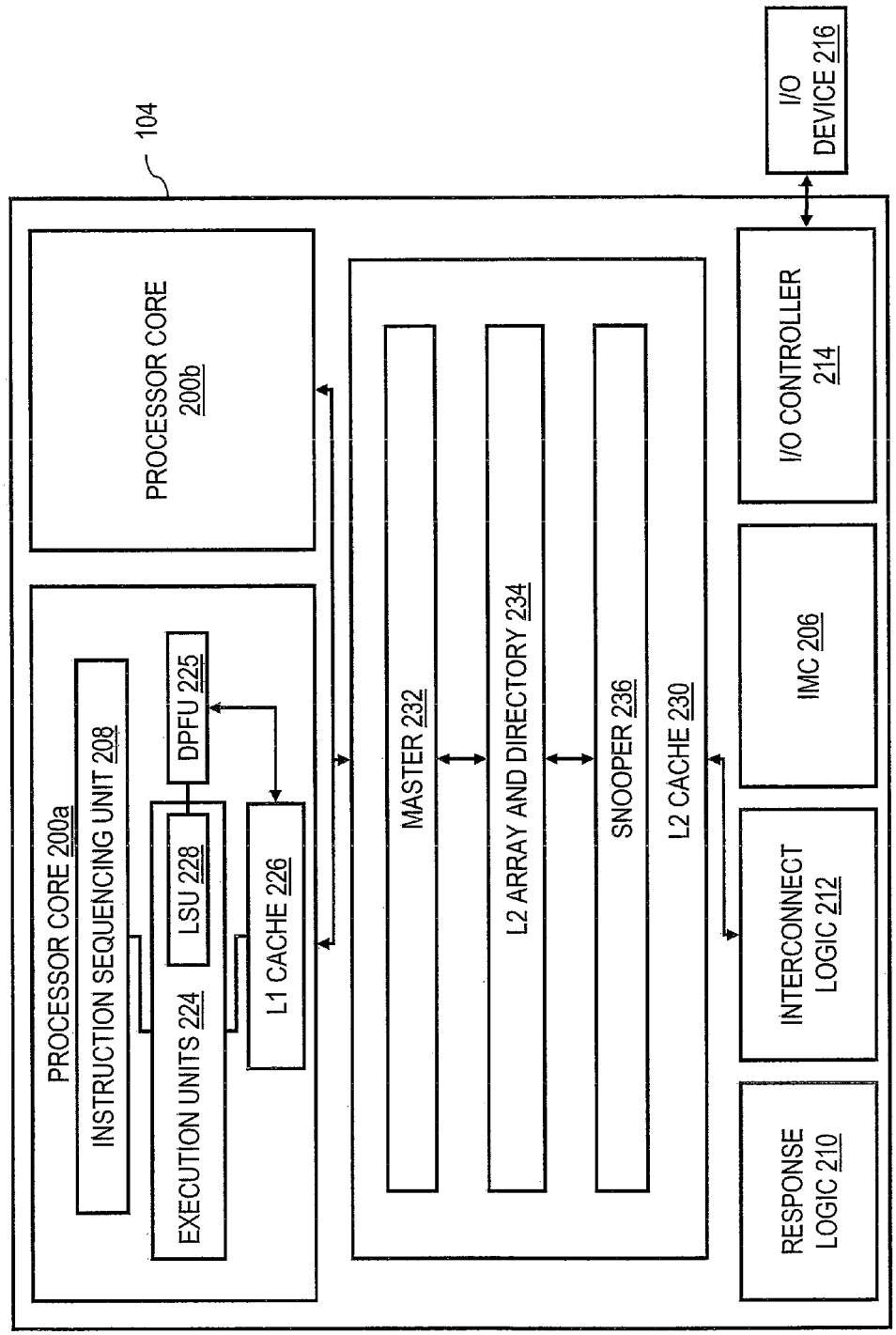
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for prefetching and demand fetching instructions and for ordering instructions for execution by one or more execution units 224. Execution units 224 preferably include a load-store unit (LSU) 228 for executing memory access instructions that references a memory block or cause the generation of an operation referencing a memory block. In at least some embodiments, each processor core 200 is capable of simultaneously executing instructions within two or more hardware threads of execution. Each processor core 200 preferably includes a data prefetch unit (DPFU) 225 that prefetches data in advance of demand.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped on the local interconnect 114.

In the illustrative embodiment, the cache memory hierarchy of processing unit 104 includes a store-through level one (L1) cache 226 (which may be bifurcated into separate L1 instruction and data caches) within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line, lookaside or victim cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
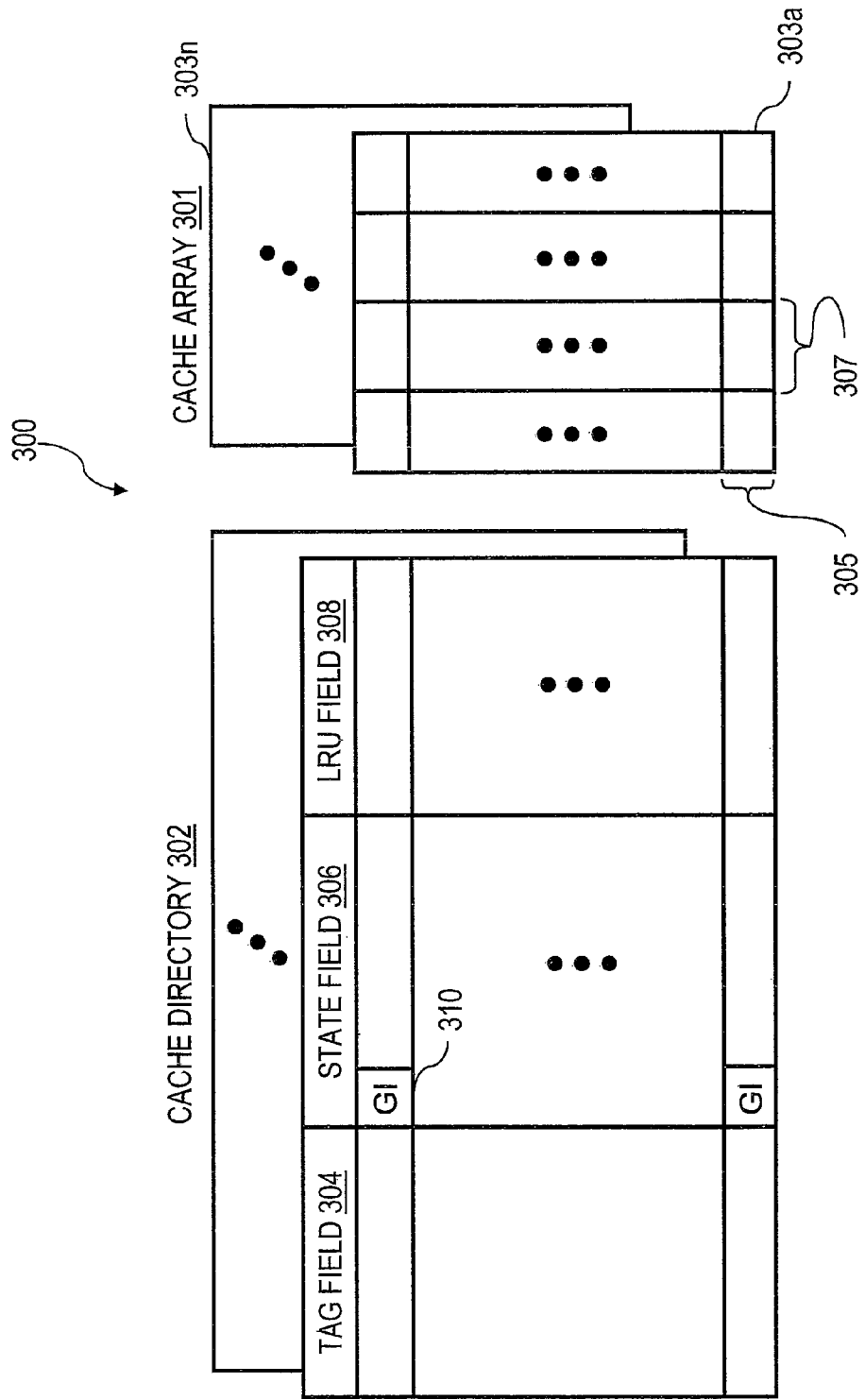
FIG. 3 is a more detailed block diagram of a cache array and directory in accordance with the present invention.

With reference now to FIG. 3, there is illustrated a more detailed block diagram of an exemplary embodiment of a cache array and directory 300, which may be utilized, for example, to implement the cache array and directory of an L1 cache 226 or L2 cache array and directory 234. As illustrated, cache array and directory 300 includes a set associative cache array 301 including multiple ways 303a-303n. Each way 303 includes multiple entries 305, each providing temporary storage for up to a full cache line of data, e.g., 128 bytes. Each cache line of data is logically formed of multiple granules 307 (in this example, four granules of 32 bytes each) that may correspond in size, for example, to the smallest allowable access to system memories 108. In accordance with the present invention, granules 307 may be individually accessed and cached in cache array 301.

Cache array and directory 300 also includes a cache directory 302 of the contents of cache array 301. As in conventional set associative caches, memory locations in system memories 108 are mapped to particular congruence classes within cache arrays 301 utilizing predetermined index bits within the system memory (real) addresses. The particular cache lines stored within cache array 301 are recorded in cache directory 302, which contains one directory entry for each cache line in cache array 301. As understood by those skilled in the art, each directory entry in cache directory 302 comprises at least a tag field 304, which specifies the particular cache line stored in cache array 300 utilizing a tag portion of the corresponding real address, a LRU (Least Recently Used) field 308 indicating a replacement order for the cache line with respect to other cache lines in the same congruence class, and a state field 306, which indicates the coherency state of the cache line.

According to the present invention, coherency states that may be utilized in state field 306 to indicate state information may be defined by the well-known MESI coherency protocol or a variant thereof. To support caching of partial cache lines in cache array 301, cache directory 302 preferably indicates which granule(s) 307 are cached in the associated entry 305. For example, in one embodiment, each state field 306 includes a granule identifier (GI) 310 that indicates which granule(s) of the cache line identified by the tag in tag field 304 are held in the associated entry 305 of cache array 301. In at least some embodiments, when GI 310 indicates that fewer than all granules of a cache line are held in the associated entry 305, state field 306 preferably indicates a "Partial" coherency state that indicates that less than the complete cache line is held by cache array 301. In such embodiments, the Partial coherency state functions like the Shared coherency state of the MESI protocol, meaning that a full copy of the cache line must be obtained prior to modification of the contents of the cache line.

Figure 4:
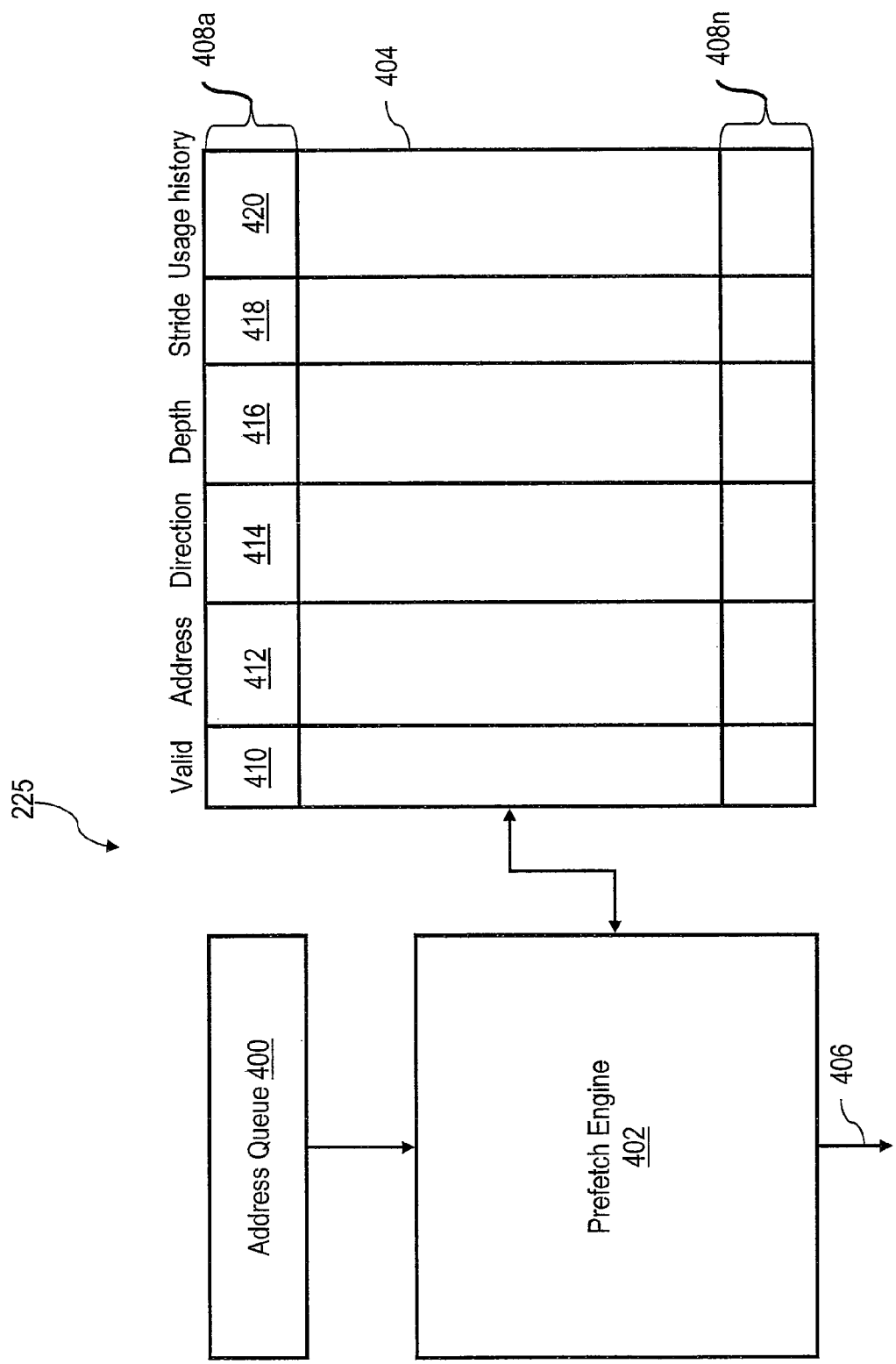
FIG. 4 is a more detailed block diagram of the data prefetch unit of FIG. 1.

Referring now to FIG. 4, there is depicted a more detailed block diagram of an exemplary data prefetch unit (DPFU) 225 in accordance with the present invention. As shown, DPFU 225 includes an address queue 400 that buffers incoming memory access addresses generated by LSU 228, a prefetch request queue (PRQ) 404, and a prefetch engine 402 that generates data prefetch requests 406 by reference to PRQ 404.

Prefetch requests 406 cause data from the memory subsystem to be fetched or retrieved into L1 cache 228 and/or L2 cache 230 preferably before the data is needed by LSU 228. The concept of prefetching recognizes that data accesses frequently exhibit spatial locality. Spatial locality suggests that the address of the next memory reference is likely to be near the address of recent memory references. A common manifestation of spatial locality is a sequential data stream, in which data from a block of memory is accessed in a monotonically increasing (or decreasing) sequence such that contiguous cache lines are referenced by at least one instruction. When DPFU 225 detects a sequential data stream (e.g., references to addresses in adjacent cache lines), it is reasonable to predict that future references will be made to addresses in cache lines that are adjacent to the current cache line (the cache line corresponding to currently executing memory references) following the same direction. Accordingly, DPFU 225 generates data prefetch requests 406 to retrieve one or more of these adjacent cache lines before the program actually requires them. As an example, if a program loads an element from a cache line n, and then loads an element from cache line n+1, DPFU 225 may prefetch cache some or all of cache lines n+2 and n+3, anticipating that the program will soon load from those cache lines also.

As further depicted in FIG. 4, in at least some embodiments, PRQ 404 includes a plurality of stream registers 408. In the depicted embodiment, each stream register 408 contains several fields describing various attributes of a corresponding sequential data stream. These fields include a valid field 410, an address field 412, a direction field 414, a depth field 416, a stride field 418, and a usage history field 420. Valid field 410 indicates whether or not the contents of its stream register 408 are valid. Address field 402 contains the base address (effective or real) of a cache line or partial cache line in the sequential data stream. Direction field 414 indicates whether addresses of cache lines in the sequential data stream are increasing or decreasing. Depth field 416 indicates a number of cache lines or partial cache lines in the corresponding sequential data stream to be prefetched in advance of demand. Stride field 418 indicates an address interval between adjacent cache lines or partial cache lines within the sequential data stream. Finally, usage history field 420 indicates which one(s), if any, of the granules 307 within the most recently prefetched cache line in the sequential data stream were actually accessed by a demand memory access instruction executed by LSU 228. For example, in an exemplary embodiment, usage history field 418 includes one bit for each granule 307 in one or more prefetched cache lines in the sequential data stream, and prefetch engine 402 of DPFU 225 sets the corresponding bit in usage history field 418 (e.g., to a logical "1") when LSU 228 calculates an address for a memory access operation that accesses the granule.

With reference now to FIG. 5A, there is depicted a high level logical flowchart of an exemplary process by which DPFU 225 allocates entries in PRQ 404 in accordance with the present invention. The process begins at block 500 and the proceeds to block 501, which depicts DPFU 225 receiving from LSU 228 within address queue 400 a memory access address (e.g., effective or real address) of a demand memory access. The process then proceeds to block 502, which depicts prefetch engine 402 of DPFU 225 determining by reference to PRQ 404 whether or not the address received at block 501 falls within an existing sequential data stream to which a stream register 408 has been allocated. If prefetch engine 402 determines at block 504 that the address belongs to an existing sequential data stream, the process proceeds to block 508, which is described below. If prefetch engine 402 determines at block 504 that the address does not belong to an existing sequential data stream, prefetch engine 402 determines at block 504 whether or not to allocate a new sequential data stream, for example, based upon a miss for the memory access address in L1 cache 226, the availability of an unallocated stream register 408, and/or previous receipt of a closely spaced memory access address.

If prefetch engine 402 determines to not allocate a new sequential data stream at block 504, the process shown in FIG. 5 simply terminates at block 510. If however, prefetch engine 402 determines to allocate a new sequential data stream at block 504, prefetch engine 402 allocates one of stream registers 408 to the sequential data stream and populates fields 410-420 of the allocated stream register 408 (block 506). Allocation of the stream register 408 may entail selection of a stream buffer 408 based upon, for example, the contents of usage history fields 420 of stream registers 408 and/or unillustrated replacement history information indicating a stream register 408 to be replaced according to a replacement algorithm, such as Least Recently Used (LRU) or round robin. Following block 506, the process terminates at block 510.

Referring now to block 508, in response to a determination that the memory access address received at block 501 falls within an existing sequential data stream to which a stream register 408 has been allocated in PRQ 404, prefetch engine 402 updates the state of the stream register 408 allocated to the sequential data stream. For example, prefetch engine 402 may update address field 412 with the memory access address or modify depth field 416 or stride field 418. In addition, prefetch engine 402 updates usage history field 420 to identify the granule(s) of the cache line associated with the memory access address that will be accessed by the demand memory access. In this manner, prefetch engine 402 builds a history of the usage of cache lines and partial cache lines prefetched into cache memory utilizing data prefetching. It will be appreciated that in alternative embodiments, the usage history can be gathered in other ways, for example, by directly monitoring the inputs and/or outputs of L1 cache 226 and/or L2 cache 230. Following block 508, the process terminates at block 510.

With reference now to FIG. 5B, there is illustrated a high level logical flowchart of an exemplary process by which DPFU 225 generates data prefetch requests 406 in accordance with the present invention. According to at least some embodiments, DPFU 225 varies an amount of data requested by data prefetch requests 406 based upon the usage history of previously requested data.

The process depicted in FIG. 5B begins at block 520 and then proceeds to block 522, which illustrates prefetch engine 402 selecting a stream register 408 from which to generate a data prefetch request 406, for example, based upon demand memory access addresses received from LSU 228, the contents of usage history fields 420, and/or a selection ordering algorithm, such as Least Recently Used (LRU) or round robin. Following selection of the stream register 408 from which a data prefetch request 406 is to be generated, prefetch engine 402 determines the amount of data to be requested by the data prefetch request 406 by reference to the usage history field 420 of the selected stream register 408 (block 524). In the depicted embodiment, the amount determination is binary, meaning that the data prefetch request 406 will request either a full cache line (e.g., 128 bytes) or a single predetermined subset of full cache line, such as a single granule (e.g., 32 bytes). Of course, in other embodiments, prefetch engine 402 may select any of multiple sizes of partial cache lines or a full cache line as the amount of data to be prefetched. Thus, the amount of data prefetched by prefetch engine 402 scales down and up with actual use.

In the depicted embodiment, if prefetch engine 402 determines at block 524 that usage history field 420 indicates a pattern in which demand accesses were made to multiple granules of one or more previously accessed cache lines in the sequential data stream, prefetch engine 402 generates a data prefetch request 406 for a full cache line at block 526. Alternatively, if prefetch engine 402 determines at block 524 that usage history field 420 indicates a pattern in which demand accesses were made to only a single granule in each of one or more previously accessed cache lines in the sequential data stream, prefetch engine 402 generates a data prefetch request 406 for a partial cache line (e.g., the single granule that had been previously accessed) at block 528. Following either block 526 or block 528, prefetch engine 402 transmits the data prefetch request 406 to the memory hierarchy (e.g., to L2 cache 230 or to IMCs 206) in order to prefetch the target partial or full cache line into cache memory. Thereafter, the process depicted in FIG. 5B terminates at block 532.

As has been described, in at least some embodiments, a processor maintains a usage history indicating demand usage of prefetched data retrieved into cache memory. The processor selects an amount &f data to prefetch by a data prefetch request based upon the usage history, and then transmits the data prefetch request to a memory hierarchy to prefetch the selected amount of data into cache memory.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a processor, said method comprising:

the processor maintaining, in each of a plurality of stream registers, information describing attributes of an associated one of a plurality of sequential data streams, wherein the information in each of the plurality of stream registers includes:
- a stride indicating a monotonically changing address sequence employed to generate target addresses of data prefetch requests in the associated one of the plurality of sequential data streams;
- a usage history indicating, for the associated one of the plurality of sequential data streams, demand usage of prefetched data in the associated one of the plurality of sequential data streams that was retrieved into cache memory;

the processor sequentially generating a plurality of data prefetch requests in a particular sequential data stream among the plurality of data streams, wherein the generating includes:
- determining target addresses of the plurality of data prefetch requests by reference to the stride of a particular stream register among the plurality of stream registers that is associated with the particular sequential data stream;

the processor selecting a respective non-zero amount of data to be prefetched by each of the plurality of data prefetch requests based upon the usage history of the particular sequential data stream, wherein the selecting includes selecting, for a data prefetch request among the plurality of data prefetch requests, a greater first amount of data from a target cache line of the data prefetch request in response to the usage history of the particular sequential data stream indicating a pattern of demand usage of more than a given amount of data in one or more other cache lines prefetched by one or more of the plurality of data prefetch requests preceding the data prefetch request and otherwise selecting a lesser second amount of data from the target cache line; and the processor transmitting the plurality of data prefetch requests to a memory hierarchy to prefetch the selected amount of data from each target cache line into cache memory.

2. The method of claim 1, wherein said selecting comprises selecting the amount from among a full cache line and a partial cache line.

3. The method of claim 1, wherein:
- said data prefetch request comprises one of a plurality of data prefetch requests made in sequence for the particular sequential data stream; and
- said method further comprises scaling amounts of data requested by the plurality of prefetch requests over time in accordance with the usage history of the particular sequential data stream.

4. The method of claim 1, and further comprising updating the usage history of the particular sequential data stream in response to computation of a target address of a memory access request by the processor.

5. The method of claim 1, and further comprising allocating a stream register to hold the usage history of the particular sequential data stream in response to a determination that a target address of a memory access request does not fall within any other of the plurality of sequential data streams.

6. A processor, comprising:
- an instruction sequencing unit that order instructions for execution;
- at least one execution unit that executes instructions; and
- a data prefetch unit that maintains, in each of a plurality of stream registers, information describing attributes of an associated one of a plurality of sequential data streams, wherein the information in each of the plurality of stream registers includes:
  - a stride indicating a monotonically changing address sequence employed to generate target addresses of data prefetch requests in the associated one of the plurality of sequential data streams;
  - a usage history indicating, for the associated one of the plurality of sequential data streams, demand usage of prefetched data in the associated one of the plurality of sequential data streams that was retrieved into cache memory,
- wherein the prefetch unit generates a plurality of data prefetch requests in a particular data stream among the plurality of data streams, wherein the prefetch unit determines target addresses of the plurality of data prefetch requests by reference to the stride of a particular stream register among the plurality of stream registers that is associated with the particular sequential data stream;
- wherein the prefetch unit selects an amount of data to be prefetched by each of the plurality of data prefetch requests based upon the usage history of the particular sequential data stream, wherein the data prefetch unit selects, for a data prefetch request among the plurality of data prefetch requests, a greater first amount of data from a target cache line of the data prefetch request in response to the usage history of the particular sequential data stream indicating a pattern of demand usage of more than a given amount of data in one or more other cache lines prefetched by one or more of the plurality of data prefetch requests preceding the data prefetch request and otherwise selects a lesser second amount of data from the target cache line; and
- wherein the prefetch unit transmits theluiyit of data prefetch requests to a memory hierarchy to prefetch the selected amount of data from each target cache line into cache memory of the processor.

7. The processor of claim 6, wherein said data prefetch unit selects the amount from among a full cache line and a partial cache line.

8. The processor of claim 6, wherein:
- said data prefetch request comprises one of a plurality of data prefetch requests made in sequence for the particular sequential data stream; and
- said data prefetch unit scales amounts of data requested by the plurality of prefetch requests over time in accordance with the usage history of the particular sequential data stream.

9. The processor of claim 6, wherein the data prefetch unit updates the usage history of the particular sequential data stream in response to computation of a target address of a memory access request by the at least one execution unit.

10. The processor of claim 6, wherein:
- the data prefetch unit includes a queue containing multiple stream registers, each associated with a respective one of the plurality of sequential data streams; and
- the data prefetch unit allocates a stream register among the multiple stream registers that contains a usage history field for the usage history of the particular sequential data stream in response to a determination that a target address of a memory access request does not fall within any other of the plurality of sequential data streams.

11. A data processing system, comprising:
- a memory hierarchy including a higher latency system memory and a lower latency cache memory;
- a system interconnect; and at least one processor coupled to the system interconnect and the memory hierarchy, said at least one processor including:
an instruction sequencing unit that order instructions for execution;
at least one execution unit that executes instructions; and
a data prefetch unit that maintains, in each of a plurality of stream registers, information describing attributes of an associated one of a plurality of sequential data streams, wherein the information in each of the plurality of stream registers includes:
a stride indicating a monotonically changing address sequence employed to generate target addresses of data prefetch requests in the associated one of the plurality of sequential data streams;
a usage history indicating, for the associated one of the plurality of sequential data streams, demand usage of prefetched data in the associated one of the plurality of sequential data streams that was retrieved into cache memory,
wherein the prefetch unit generates a plurality of data prefetch requests in a particular data stream among the plurality of data streams wherein the prefetch unit determines target addresses of the plurality of data prefetch requests by reference to the stride of a particular stream register among the plurality of stream registers that is associated with the particular sequential data stream;
wherein the prefetch unit selects an amount of data to be prefetched by each of the plurality of data prefetch requests based upon the usage history of the particular sequential data stream, wherein the data prefetch unit selects, for a data prefetch request among the plurality of data prefetch requests, a greater first amount of data from a target cache line of the data prefetch request in response to the usage history of the particular sequential data stream indicating a pattern of demand usage of more than a given amount of data in one or more other cache lines prefetched by one or more of the plurality of data prefetch requests preceding the data prefetch request and otherwise selects a lesser second amount of data from the target cache line; and
wherein the prefetch unit transmits the plurality of data prefetch requests to a memory hierarchy to prefetch the selected amount of data from each target cache line into cache memory of the processor.

12. The data processing system of claim 11, wherein said data prefetch unit selects the amount from among a full cache line and a partial cache line.

13. The data processing system of claim 11, wherein:
said data prefetch request comprises one of a plurality of data prefetch requests made in sequence for the particular sequential data stream; and
said data prefetch unit scales amounts of data requested by the plurality of prefetch requests over time in accordance with the usage history of the particular sequential data stream.

14. The data processing system of claim 11, wherein the data prefetch unit updates the usage history of the particular sequential data stream in response to computation of a target address of a memory access request by the at least one execution unit.

15. The data processing system of claim 11, wherein:
the data prefetch unit includes a queue containing multiple stream registers, each associated with a respective one of the plurality of sequential data streams; and
the data prefetch unit allocates a stream register among the multiple stream registers that contains a usage history field for the usage history of the particular sequential data stream in response to a determination that a target address of a memory access request does not fall within any other of the plurality of sequential data streams.

* * * * *